(12) United States Patent
Talbot

(10) Patent No.: US 8,893,462 B2
(45) Date of Patent: Nov. 25, 2014

(54) SICKLE KNIFE CUTTER FOR HARVESTING CROP WITH A QUICK RELEASE KNIFE SECTION

(71) Applicant: MacDon Industries Ltd., Winnipeg (CA)

(72) Inventor: Francois R. Talbot, Winnipeg (CA)

(73) Assignee: MacDon Industries Ltd., Winnipeg, MB (CA)

( * ) Notice: Subject to any disclaimer, the term of this patent is extended or adjusted under 35 U.S.C. 154(b) by 0 days.

(21) Appl. No.: 13/901,952

(22) Filed: May 24, 2013

(65) Prior Publication Data

US 2014/0033672 A1 Feb. 6, 2014

Related U.S. Application Data

(60) Provisional application No. 61/677,586, filed on Jul. 31, 2012.

(51) Int. Cl.
*A01D 34/18* (2006.01)
*A01D 34/14* (2006.01)
*A01D 34/13* (2006.01)

(52) U.S. Cl.
CPC ............... *A01D 34/13* (2013.01); *A01D 34/14* (2013.01); *A01D 34/18* (2013.01)
USPC ............................................................ 56/298

(58) Field of Classification Search
USPC .................................................. 56/296–303
See application file for complete search history.

(56) References Cited

U.S. PATENT DOCUMENTS

| 318,802 | A | 5/1885 | Ratcliff |
| 531,987 | A | 1/1895 | Wiseman |
| 540,623 | A | 6/1895 | Ball et al. |
| 574,736 | A | 1/1897 | Jarvis |
| 668,486 | A | 2/1901 | Brown |
| 683,118 | A | 9/1901 | Hodges |
| 954,009 | A | 4/1910 | Wilson et al. |
| 974,707 | A | 11/1910 | Poole et al. |
| 985,948 | A | 3/1911 | Smith et al. |
| 1,049,675 | A | 1/1913 | Conner |
| 1,218,511 | A | 3/1917 | Berglund |
| 1,231,111 | A | 6/1917 | Alford |

(Continued)

*Primary Examiner* — Thomas B Will
*Assistant Examiner* — Mai Nguyen
(74) *Attorney, Agent, or Firm* — Adrian D. Battison; Ade & Company Inc.

(57) ABSTRACT

In a sickle cutting apparatus including a row of stationary knife guards and a sickle bar with a row of blade sections for reciprocating movement mounted thereon, each of the blade sections is simply removable from the sickle bar for replacement by mounting a rear plate portion on the sickle bar where each of the rear plate portions has a pair of holes bolted to mating holes in the bar and each hole in the blade is connected to an associated slot extending rearwardly in the rear plate portion from the hole to a rear edge. In this way the blade section can be pulled forwardly by loosening the bolt and sliding the bolt along the slot until the blade is released. A circular counter-bore in the blade section receives a nut when tightened to hold the blade section in place. The system can be used with pointed guards or stub guards.

18 Claims, 8 Drawing Sheets

(56) References Cited

U.S. PATENT DOCUMENTS

| | | | |
|---|---|---|---|
| 2,234,783 A * | 3/1941 | Snow | 56/309 |
| 3,295,300 A * | 1/1967 | Yeske | 56/296 |
| 3,699,758 A * | 10/1972 | Scarnato et al. | 56/307 |
| 3,978,645 A * | 9/1976 | Bennett et al. | 56/310 |
| 4,750,321 A * | 6/1988 | Klein | 56/310 |
| 4,894,979 A | 1/1990 | Lohrentz | |
| 4,909,026 A | 3/1990 | Molzahn | |
| 5,979,152 A * | 11/1999 | McCredie | 56/298 |
| 6,962,040 B2 | 11/2005 | Talbot | |
| 7,328,565 B2 | 2/2008 | Snider | |
| 2008/0006016 A1 * | 1/2008 | Snider et al. | 56/297 |

* cited by examiner

SICKLE KNIFE CUTTER FOR HARVESTING CROP WITH A QUICK RELEASE KNIFE SECTION

This application claims the benefit under 35 USC 119(e) of Provisional Application 61/677,586 filed Jul. 31, 2012.

This invention relates to a sickle knife cutter for harvesting crop with a quick release knife section.

BACKGROUND OF THE INVENTION

The present invention relates to a sickle cutting apparatus which generally comprises a sickle bar mounted in transversely extending position and driven for reciprocating movement relative a set of guard fingers where the sickle bar has a plurality of knife blade sections mounted thereon with first and second side cutting edges to cooperate with shearing edges of the guard guards. Each of the knife guards has a base portion for mounting on the cutter bar and at least one guard finger mounted on the base portion so that the fingers are arranged in a row along the cutter bar with a space between each finger and the next allowing crop to enter the space up to a position of engagement with a rear trash bar. Each of the knife guard fingers has an upwardly facing ledger surface with opposed side edges to provide first and second shearing edges. Typically each of the guard fingers has a downwardly facing ground engaging surface shaped and arranged to provide protection for stone engagement. A hold down arrangement on top of at least some of the guard fingers acts to prevent lifting of the blades away from the guard surface.

Two methods have commonly been used to fasten knife sections to the sickle bar otherwise known as the knife-back.

Many years ago, the sections were normally fastened to the knife-back by means of rivets. To replace a section, the rivet heads were normally sheared off, the rivets pushed out, and a new section installed with new rivets. Some tools have been developed to facilitate this, but the process remained too labor intensive and inconvenient.

A more acceptable method of securing the sections which is commonly used today is to use threaded hardware. A common style of bolt used in the industry is a knurled bolt which is pressed into the knife-back. The knurls provide the "press fit" between the bolt and the knife-back. To replace a section when the hardware is still intact, the threaded nuts are removed, the old section lifted out and replaced, and the nuts are replaced. Depending on the style of guard and hold-down used, it is generally necessary to remove or at least loosen a guard or hold-down so that the section can be lifted out. In some other cases, the bolts can be pushed out so that the knife section can be slid out.

The term "sickle bar" as used herein is intended to refer generally to a structure which supports all of the blade sections at the spaced positions along its length and is not intended to be limited to a single continuous element extending along the whole length of the structure. Thus the bar may be formed of different elements at different parts of the length and may include pieces below and above the blade sections.

Pointed guards generally feature a point with a cut slot that the sickle sections reciprocate through. Various types of hold-down arrangement are used to apply pressure to the sickle to keep its shearing surface in close contact with the guard ledger as cutting occurs. Usually these are located between the guard points or at the rear edge of the sickles. Most are sheet metal and are typically adjusted using a hammer or a simple single point threaded adjustment. By keeping the hold-downs separate from the guards fewer hold-downs than points may be used to reduce the cost and number of adjustments required. Pointed guards have found much favor in easier cutting conditions due to the ease of adjustment and superior performance.

Another form of guard is known as a stub guard which is formed in two separate pieces including a base piece which carries the ledger surface and a top piece which extends over the ledger surface. The pieces are separate and separately adjustable relative to the cutter bar so that the top piece can apply pressure onto the blade portion to press it onto the ledger surface. The pieces terminate at a front edge which is just behind the front edge of the blade portion so that the front edge of the blade portion is presented to the crop.

In tough cutting, stub or no-clog guards have found the most favor. Stub guards use a separate top and bottom guard pieces that spaced slightly more than one sickle thickness apart create a slot for the sickle to operate in. The front edge of the sickle section protrudes slightly past the front tip of the two guard sections. This feature is what originally gave stub-guards their non-clogging self-cleaning action. A major improvement in stub guard technology was made when fully adjustable top hold-down assemblies were introduced. These arrangements allowed the gap to be controlled much more precisely than previously so that the shearing surface of the blade portion was kept in close contact with the guard ledger surface. This adjustability allows the stub top piece to act as a much more effective hold-down than the hold-downs found on regular pointed guard systems.

The pointed guard has an advantage of presenting a point to the incoming crop so that crop is effectively divided around it. This is especially advantageous when the sickle blade is at or near the end or start of each stroke and the blunt front edge of each blade or section is hidden partially or entirely within the guard slot. Since the sickle bar velocity is lowest at or near the end or start of each stroke this gives the pointed guard a considerable advantage.

The guards can be formed as single elements separately mounted on the guard bar or as double or triple elements connected together side by side for common mounting and common adjustment relative to the guard bar. There is no reason why more elements might be included but this is not typical.

In some cases the arrangement is of the double sickle type where each sickle bar is essentially half the length of the cutter bar and the cutter bars reciprocate in opposite phase to minimize vibrating mass and vibrations. Usually the sickle bars are timed so that they move in opposite directions so that vibrations induced into the cutter bar assembly are minimized.

The sickle knife cutting system has been widely accepted as the most power efficient system due to the shearing action. However due to speed restrictions of generally less than 5 to 8 mph ground speed, other systems such as rotating flail systems have come into use since these can be operated at much higher ground speed of up to 14 mph while maintaining a high cutting efficiency. Such rotary systems have however much higher power usage, are limited in width and provide crop handling difficulties for forming effective swaths for drying of the crop.

SUMMARY OF THE INVENTION

It is one object of the present invention to provide an easier and quicker method for replacing a knife section in the event of breakage or wear of the knife section.

According to a first aspect of the invention there is provided a sickle cutting apparatus comprising:

a frame structure arranged for forward travel over ground having a standing crop thereon;

a cutter bar secured to the frame structure and extending transversely across a front end of said frame structure;

a plurality of stationary knife guards mounted along the cutter bar and each knife guard including at least one finger projecting forwardly therefrom;

each guard finger having an upwardly facing ledger surface with opposed side edges thereof arranged to provide first and second shearing edges;

each guard finger having a downwardly facing ground engaging surface shaped and arranged to provide protection for stone engagement;

a sickle bar mounted in transversely extending position and being driven for reciprocating movement relative to said guard fingers;

the sickle bar having a plurality of blade sections mounted thereon for movement therewith;

each of the blade sections having a rear plate portion for mounting on the sickle bar and at least one forwardly extending blade portion;

each of the blade portions having a cutting surface for passing across the knife guard fingers;

each of the blade portions having on first and second sides first and second side cutting edges to cooperate with shearing edges of said guard fingers;

a plurality of hold-down members each having a rear mounting section mounted at the cutter bar and each including at least one forwardly extending hold-down element for engaging an upper surface of a blade section as it passes the hold-down element to hold down the blade sections onto the ledger surfaces of the guard fingers;

each of the rear plate portions having at least one hole for cooperating with a mating hole in the sickle bar for receiving through the plate portion and the sickle bar a mounting fastener;

and each hole being connected to an associated slot extending rearwardly in the rear plate portion from the hole to a rear edge of the rear plate portion.

Typically although not essentially the knife guards include more than one guard finger and often this can be three although double and quadruple guards are known.

The blade sections may include more than one blade portion and generally this can be two. Typically existing sections include only one blade portion.

Preferably each rear plate portion includes at least two holes and associated slots arranged at positions thereon spaced longitudinally of the sickle bar. This acts to hold the rear plate portion in fixed portion so that they can be held and maintained side by side along the sickle bar.

Preferably each rear plate portion has at each of its holes a peripherally extending recess surrounding the hole and recessed from the top surface of the rear plate portion to receive a peripheral portion of the fastener, generally a nut, larger in transverse dimension than the slot so that an edge of the nut is engaged into the recess to better hold the rear plate portion on the sickle bar and to accommodate loading on the blade portions without allowing the rear plate portion to come loose. In one arrangement this recess is a conical countersink However, more preferably the recess is a cylindrical counterbore around the hole which allows a peripheral edge of the nut to sit in the counter-bore and to transfer loads from the rear plate portion into the fastener It is of course highly desirable that the blade sections and the hold-down members are arranged such that the fastener in each hole in the rear plate portions is accessible from above without removing the hold down members. This may require a shaping or recessing of the hold down members at the sickle bar.

In a stub guard arrangement of the invention, each knife guard cooperates with a respective one of the hold-down members to form cooperating elements of a stub guard where the blade portions project forwardly to a position in front of the stub guards. In this arrangement, each blade section can be pulled forwardly from the stub guards and removed without removing the fasteners from the sickle bar and without removing or loosening the stub guards.

In a pointed guard arrangement of the invention, each knife guard comprises a pointed guard with a shoulder extending upwardly from the ledger surface of a guard finger thereof and a tip portion thereof extending forwardly of the shoulder. In this case, each blade section can be pulled out from the pointed guards and removed without removing the fasteners from the sickle bar and without removing or loosening the hold down members. This can be achieved typically by locating the sickle bar in a preferred longitudinal location and by sliding the blade section forwardly until it is free from its neighbors and can be moved side to side to pass the shoulder of the guard.

This movement can be assisted by providing no tang, that is, there is no portion of the pointed guard extending rearwardly over the ledger surface from the shoulder.

This movement can also be assisted where the shoulder has a width less than that of the ledger surface so as to as to allow the knife blades to be moved forwardly to a position where the each knife blade can be pulled out forward and removed without removing the fasteners from the sickle bar and without removing or loosening the hold down members. This is also assisted by having the hold-down member short enough in the fore-aft direction so that the rear portion of the sections essentially clears the hold-down member before the V of the section contacts the shoulder of the guard that extends upwards).

According to a second aspect of the invention there is provided a knife blade section for mounting on a sickle bar of a sickle cutting apparatus, the section comprising:

a rear plate portion for mounting on the sickle bar;

at least one forwardly extending blade portion;

each of the blade portions having a lower cutting surface and having on first and second sides thereof first and second side cutting edges;

the rear plate portion having at least one hole for cooperating with a mating hole in the sickle bar for receiving through the plate portion and the sickle bar a mounting fastener;

the or each hole being connected to an associated slot extending rearwardly in the rear plate portion from the hole to a rear edge of the rear plate portion.

According to a third aspect of the invention there is provided a knife guard for a sickle cutting apparatus comprising:

a rear mounting portion arranged to be mounted along a cutter bar of the sickle cutting apparatus at least one finger projecting forwardly from the rear mounting portion;

the or each guard finger having an upwardly facing ledger surface with opposed side edges thereof arranged to provide first and second shearing edges;

a shoulder extending upwardly from a forward end of the ledger surface;

a portion of the guard finger extending forwardly of the shoulder to a front guard tip;

wherein there is no portion of the guard finger extending rearwardly over the ledger surface from the shoulder;

and wherein the shoulder has a width less than that of the ledger surface.

The arrangement herein therefore consists of a knife section that has slots opened to the rear of the section instead of holes. As well, the section has a counter bore, concentric with the half circle defined by the end of the slot. The nut used to secure the section fits in the counter bore. This provides a positive means of securing the knife section in place when it is subjected to cutting loads, or in more severe cases, subjected to an impact force, usually caused when the section strikes an obstruction such as a rock. For a section that is about 3 mm thick for example, therefore, the depth of the counter-bore can be somewhere between 0.5 and 2.5 mm. A preferred depth of the counter-bore is in the order of 1 mm.

To replace a section, the nut of the fastener holding the rear plate portion in place is loosened only enough to clear the counter-bore (approximately 1 turn), and the blade section is slid forward. A new section is slid in, and the nut re-tightened.

Preferably, the style of nut used is of the flange type which has a round flange that matches the counter-bore.

A variation of this arrangement can use a countersink in place of a counter-bore. In this case, a conical shaped nut is be used to match the angle of the countersink. This method however, is not as effective in that it cannot resist as high a force as the counter-bore design.

Another variation is to use the slot without any recess forming the counter-bore or countersink. This method then relies only on the clamping friction and thus not as effective as the arrangement above.

DETAILED DESCRIPTION

Figure 1:
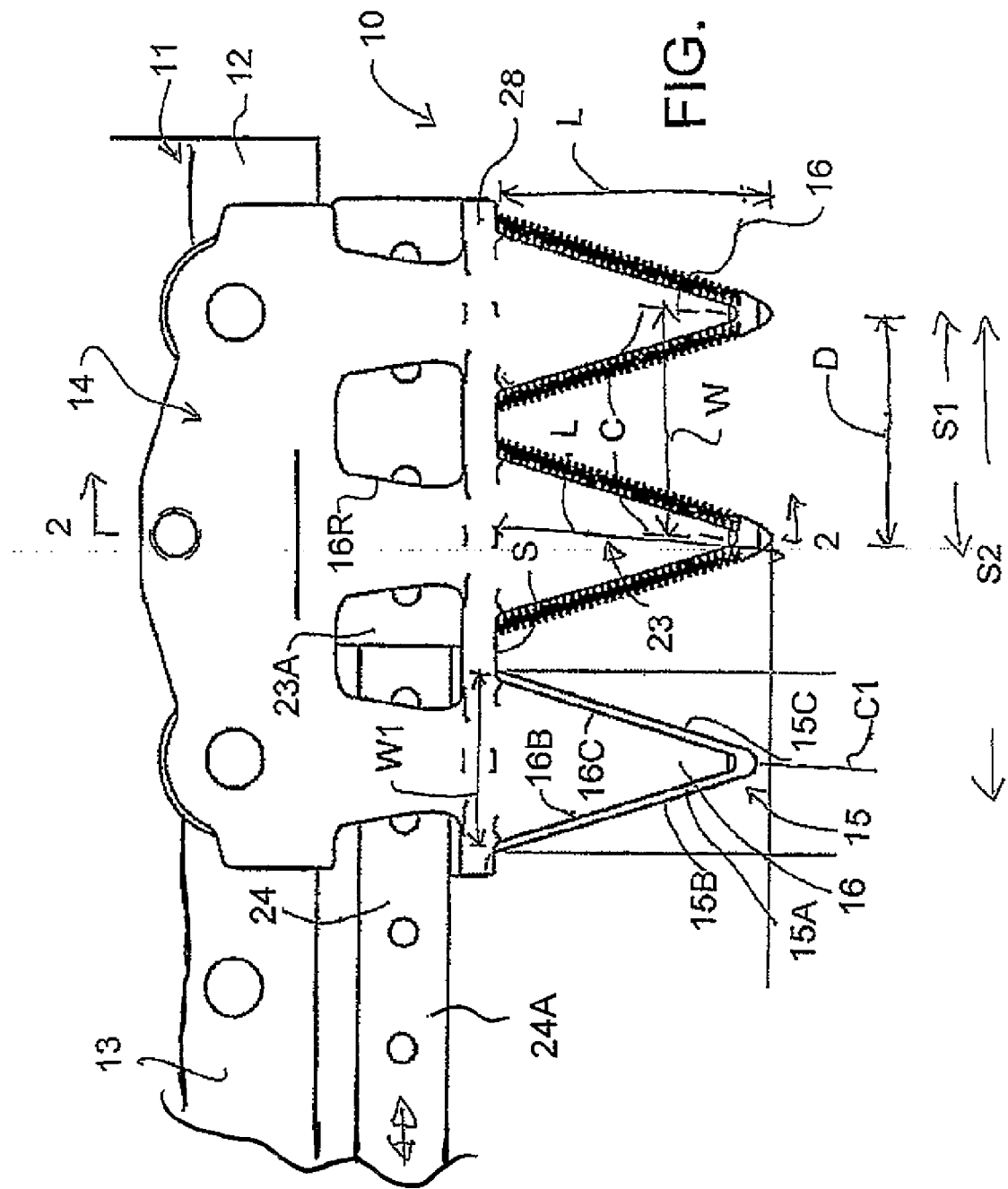
FIG. 1 is a top plan view of a part of header showing a section of the sickle knife according to a first embodiment of the present invention using a stub guard.
Figure 2:
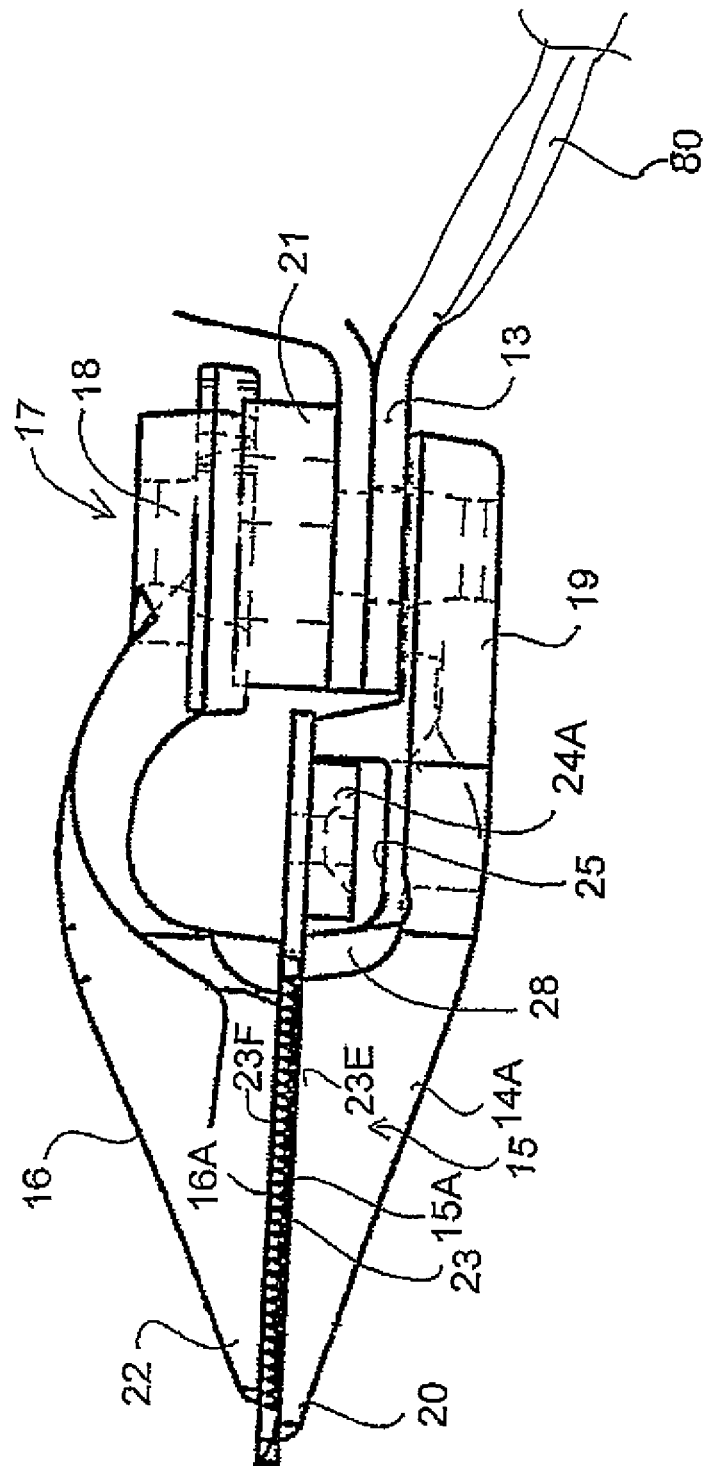
FIG. 2 is a cross-sectional view along the lines 2-2 of FIG. 1.

In FIGS. 1 and 2 is shown a first embodiment of a crop cutting device generally indicated at 10. Only a part of the complete machine is shown since the remainder of the machine may vary widely depending upon requirements and since the construction is of course well known to a person skilled in the art. In this embodiment as shown, there is a frame generally indicated at 11 which of course forms only one part of the total frame structure that is the part of the frame that is relevant to the present invention.

The cutting device 10 further includes a cutter bar 12 attached to the frame structure 11. Thus the frame structure 11 in the part as shown comprises a guard bar 13 to which is attached a plurality of knife guards 14. The guard bar 13 is attached to the frame structure which supports the guard bar in fixed position across the front edge of the frame for a cutting action of the crop cutting device on the standing crop.

The knife guards 14 are arranged in singles, pairs or triples and as shown the guard bar forms a triple guard construction where a series of such guards are mounted on the guard bar 13 at spaced positions along the length of the guard bar. In the embodiment as shown, only one of the guards is shown but it will be appreciated that there are additional guards as required to provide a crop cutting device of a required width.

The knife guards shown in FIGS. 1 and 2 are basically of a conventional construction of a stub guard in that each includes a lower portion 15 and an upper portion 16. These two portions are mounted on the guard bar 13 by a mounting arrangement 17 including bolts 18. The mounting arrangement thus attaches a rear end 19 of the lower portion 15 rigidly on the underside of the bar 13 so that the guard projects forwardly from the bar to a front nose 20. Similarly the upper portion 16 is mounted on the guard bar 13 by an adjustment plate 21 attached onto the same bolts 18. Upper portion 16 extends forwardly to a nose 22.

In the embodiment shown the guards are stub guards so that the noses of the upper and lower portions substantially overlie one another and confine between them the blade sections 23 of the sickle bar 24.

Each pair of guards thus includes two guard elements each defined by an upper portion or hold down member and a lower portion or main guard with a ledger surface for cutting. The guard elements are shown in FIG. 1 at 15 and 16. A front crop guide bar or trash bar 28 is also provided. Between the mounting bar 21 and the front guide bar 28 is provided a channel 25 within which the sickle bar 24 is mounted for reciprocating movement.

There may be a single sickle bar driven from one side or in some cases there are two sickle bars driven from opposite ends and meeting in the middle. The sickle bar or bars are driven by the reciprocating drive motor (not shown but conventional) such that the bar reciprocates by a distance generally or in most cases equal to the space between the nose of one guards 15, 16 and that of the next along the guard bar 13 so that the blade portions reciprocate from a position aligned with the first guard to a position aligned with the next and back to the first.

Figure 3:
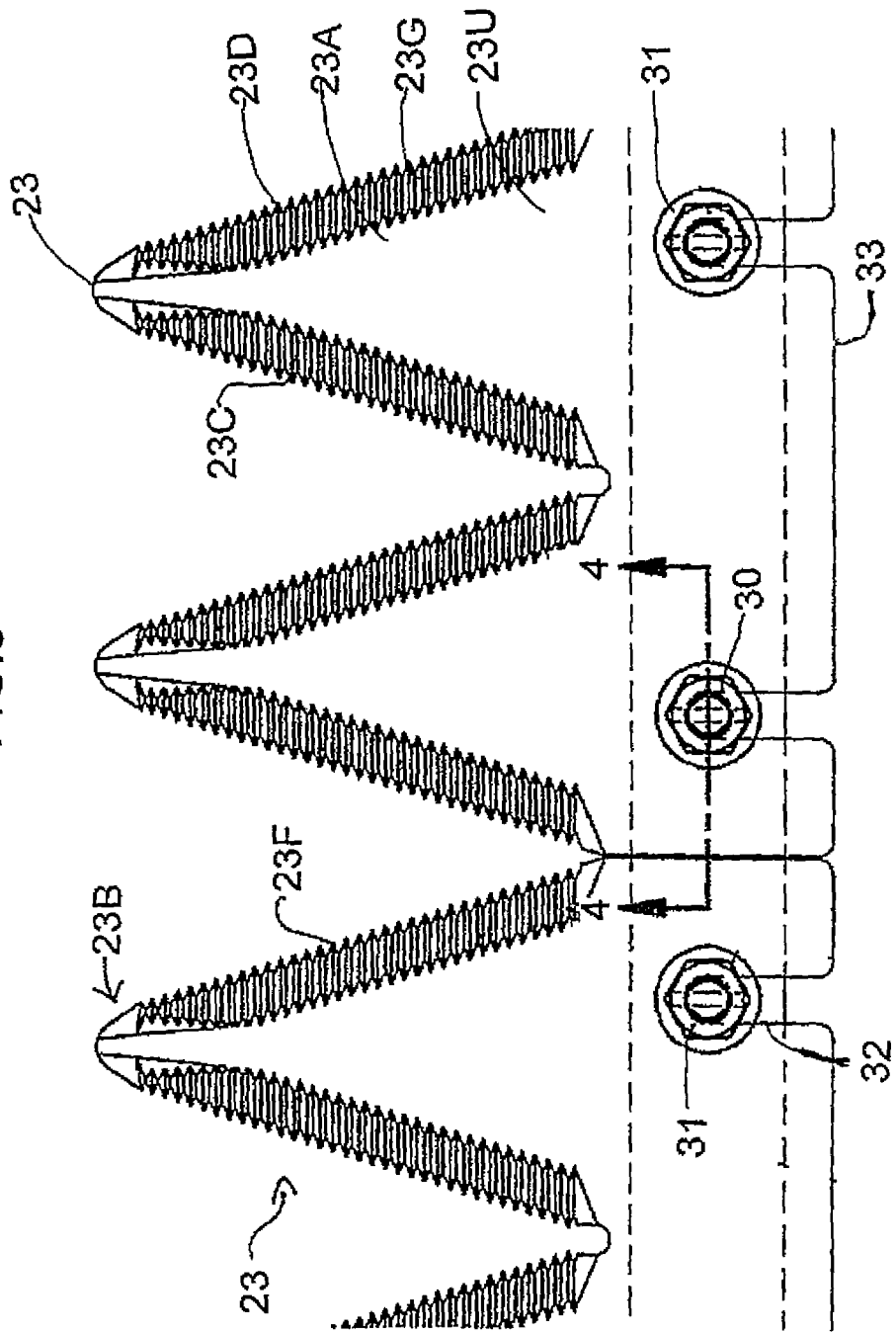
FIG. 3 is top plan view of a knife section for use in the sickle knife of FIG. 1.

Each sickle bar 24 comprises a drive bar member 24A and the plurality of blade sections indicated at 23. As shown the blade sections are formed in pairs of blade portions mounted on a common base as shown in FIG. 3, but individual blade sections may be provided or in some cases the blade sections may have more than two blade portions on the same base.

Each of the blades forms a generally triangular-shaped member which has a rear end mounting portion or base 23A bolted to the bar and converges from the rear end to a front end 23B. Each of the blades has a top surface and a bottom surface. Each of the blades has a side edge and a second side edge where the side edges are beveled from the top surface down to the bottom surface so that a sharp edge is formed at the bottom surface at each of the side edges. The blades are also serrated with at each cutting edge with grooves 23G extending at right angles to a center line.

The top hold down member 16 acts to hold the blade sections downwardly into engagement with the top ledger surface 15A of the bottom portion 15. The bottom portion 15 has two side edges 15B, 15C of the ledger surface 15A as best shown in FIG. 2 with those side edges and acting as side edges of the ledger surface. Thus the cutting action of the blade portions occurs between the ledger 15A and the bottom surface of the blade portion as the blade portion reciprocates from its position at one of the guards to its position at the next adjacent one of the guards. In this cutting action, therefore, the side edge of the blade portion moves across the space between the guards and enters onto the ledger surface of the next guard in a cutting action between the bottom surface of the blade portion and the top surface of the guard which are immediately adjacent and generally in contact or at least closely adjacent position to provide a shearing action on the crop.

In these guards, the upper portion 16 acts merely as a hold down member contacting the upper surface of each of the blade portions so as to prevent it from moving away from the ledger surface by applying pressure to that upper surface and holding it in contact with or closely adjacent the ledger surface of the bottom portion where the cutting action occurs. The upper portion therefore as shown in FIG. 1 has side surfaces 16B, 16C of the bottom surface 16A which is narrower than the ledger surface 15A of the bottom portion 15.

The mounting and adjustment arrangements for the bottom portion 15 and the other portion 16 are shown only schematically and not described in detail since these can vary in accordance with a number of different designs readily available to a person skilled in the art. It suffice to say that the hold down portion 16 is adjustable so that the gap between the bottom surface of the hold down portion and the ledger surface of the bottom portion 15 can be adjusted to allow the sliding action of the blade portions while holding the blade portions in the required position.

The disclosures of the following documents of the present Applicants are incorporated herein by reference or may be referred to for details of the construction not provided herein. These show various conventional details of the sickle knife system which can be used in the arrangement herein but are not described as they are known to persons skilled in the art.

U.S. Pat. No. 7,328,565 (Snider) issued Feb. 12, 2008;
U.S. Pat. No. 4,894,979 (Lohrentz) issued Jan. 23, 1990
U.S. Pat. No. 4,909,026 (Molzahn) issued Mar. 20, 1990.
U.S. Pat. No. 6,962,040 (Talbot) issued Nov. 8, 2005.

Typically each of the knife blade sections 23, as shown in FIG. 2, is generally triangular in shape. In the example shown as typically employed, the bade section 23 forms part of a double blade section connected by a base 23A with holes 23J for mounting on the blade drive bar 24. The blade section 23 has two side edges 23C, 23D which converge at an angle to the direction of reciprocating movement. At the front of the blade portion is provided a front apex 23B of a front arrow head shaped portion.

The blade has a bottom cutting surface 23E for passing across the ledger surface 15A of the bottom knife guards 15 and an opposed or upper surface 23F. The two converging side cutting edges are beveled from the upper surface to the bottom cutting surface to cooperate with the shearing edges of the knife guards. In addition the beveled side edges are typically serrated with grooves 23G running in a direction longitudinal to the reciprocating direction.

Figure 4:
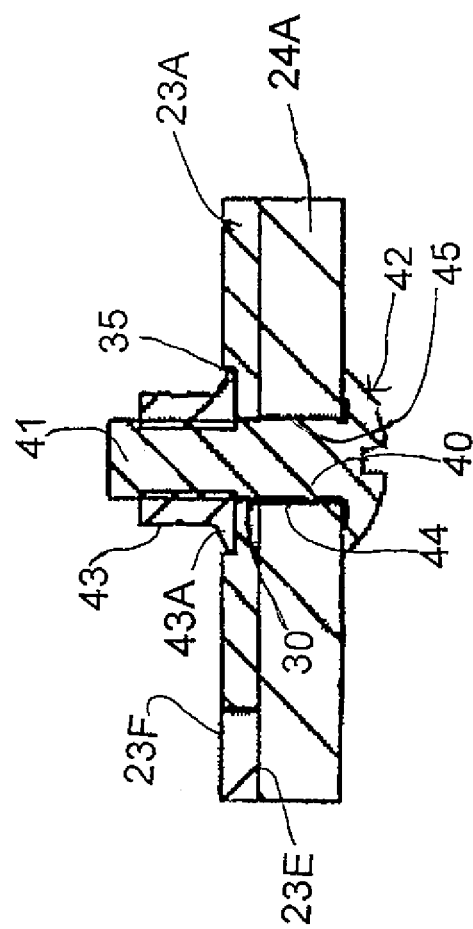
FIG. 4 is a cross-sectional view along the lines 4A-4A of the knife section of FIG. 3.

As best shown in FIGS. 3 and 4, each of the rear plate portions 23A of the blade sections has at least one hole and generally two holes 30, 31 for cooperating with a mating hole 44 in the drive bar 24A for receiving through the plate portion 23A and the drive bar 24A a mounting fastener 40 in the form of a bolt with a threaded shank 41 and a head 42 for cooperation with a nut 43.

Each hole 30, 31 is connected to an associated slot 32 extending rearwardly in the rear plate portion 23A from the hole 30, 31 to a rear edge 33 of the rear plate portion 23A. The width of the slot 32 is equal to the diameter of the hole 30, 31 so that the shank 41 can slide through the slot 32 to the hole 30, 31 where it is located in the hole while being held in the mating hole 44. The shank 41 is typically knurled or ribbed at section 45 so as to remain as a press fit in the hole 44 when the nut 43 is removed and the rear plate portion 23A slid out.

At each of the holes 30, 32 is provided a peripherally extending recess 35 surrounding the hole 30, 31 and recessed from the upper surface 23F of the blade at the rear plate portion 23A to receive a peripheral edge portion 43A of the nut 43. The peripheral portion 43A forms a ring which is larger in transverse dimension than the slot 32 and the hole 30, 31 so that the peripheral edge 43A of the nut 43 is engaged into the recess 35 to better hold the rear plate portion 23A on the sickle bar 24 and to accommodate loading on the blade portions 23 without allowing the rear plate portion 23A to come loose from the sickle bar 24.

In another alternative arrangement (not shown) this recess is a conical countersink. However, more preferably as shown in FIG. 4 the recess 35 is a cylindrical counter-bore around the hole 30, 31 which allows the peripheral edge 43A of the nut to sit in the counter-bore and to transfer loads from the rear plate portion 23A into the fastener 40.

Thus the mounting of the knife section that has slots 32 opened to the rear edge 33 of the section 23 instead of simple holes. As well, the section has the counter bore 35, concentric with the half circle or hole 30, 32 defined by the end of the slot 32. The fastener 40 used to secure the section 23A fits in the counter bore 35. This provides a positive means of securing the knife section in place when it is subjected to cutting loads, or in more severe cases, subjected to an impact force, usually caused when the section strikes an obstruction such as a rock. The depth of the counter-bore 35 can be somewhere between 0.5 and 2.5 mm. A preferred depth of the counter-bore is in the order of 1 mm.

To replace a section 23, the nut 43 of the fastener 40 holding the rear plate portion 23A in place is loosened only enough to clear the counter-bore 35 (approximately 1 turn), and the blade section 23 is slid forward until the blade section is released by the fastener 40 emerging from the slot 32. A new section is slid in reverse direction, and the nut 42 re-tightened.

As shown in FIG. 1, the knife blades 23 and the hold-down members or upper guards 16 are arranged such that the nut 43 in each hole in the rear plate portions 23A is accessible from above without removing the hold down members 16 so that, as shown in FIG. 4, the nut 43 projects upwardly from the upper surface 23F so that it can be engaged for loosening. For this reason the sides of the hold down members 16 at the sickle bar 24 are recessed at 16R so that the hold down members are narrower at the recess 16R than at the sides 16B, 16C of the front finger portion 16F overlying the lower guard 15.

In the stub guard arrangement of FIGS. 1 and 2, the blade sections 23 project forwardly to the front apex 23B in front of the stub guards 15, 16. In this arrangement, each knife blade section 23 can be simply pulled forwardly from the stub guards 15, 16 by grasping the apex 23B and removed without removing the fasteners 40 from the drive bar 24A and without removing or loosening the stub guards 15, 16.

Figure 5:
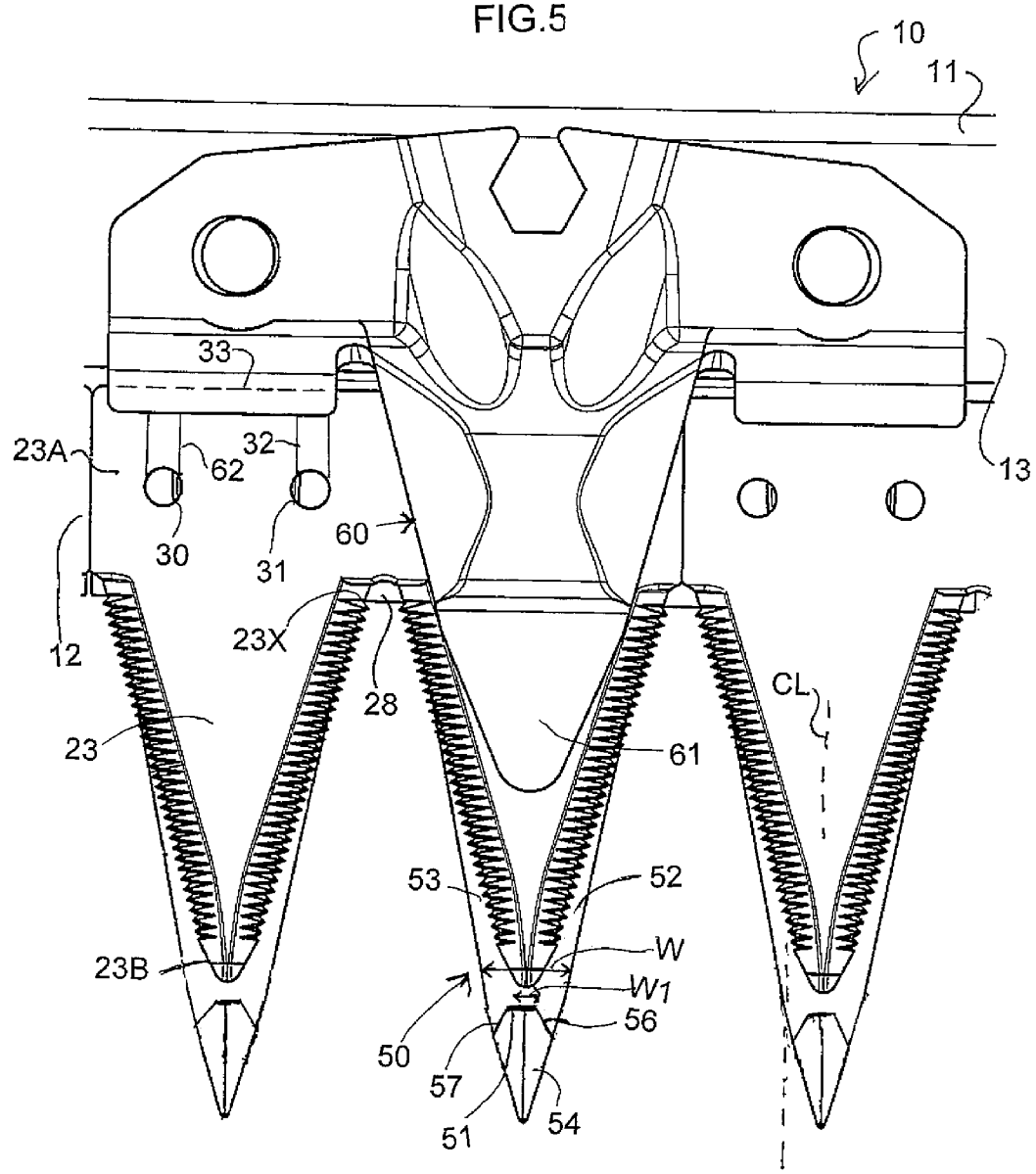
FIG. 5 is a top plan view of a part of header showing a section of the sickle knife according to a second embodiment of the present invention using a pointed guard.
Figure 6:
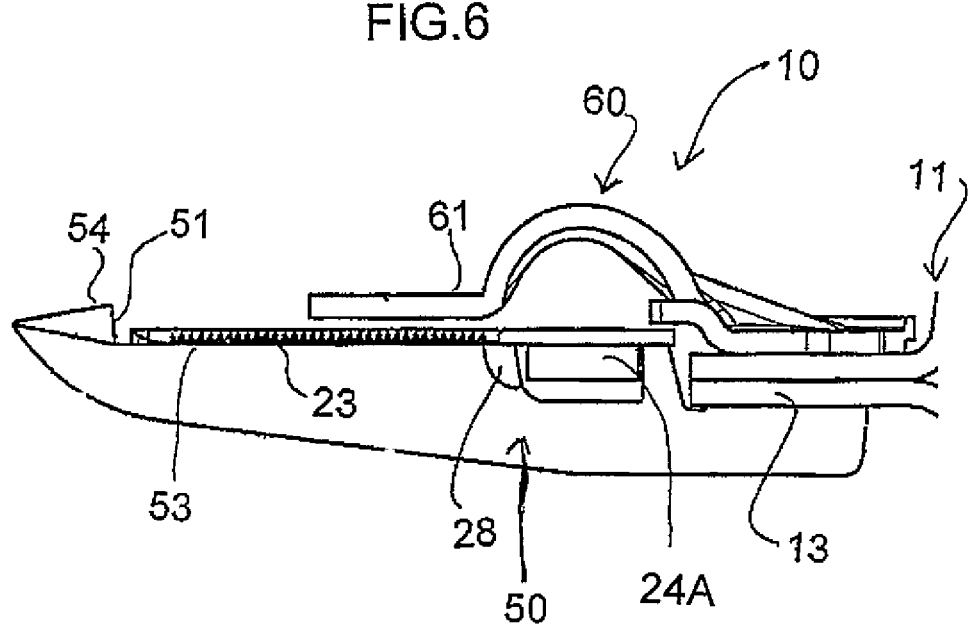
FIG. 6 is a cross-sectional view along the lines 6-6 of the knife section of FIG. 5.

In the pointed guard arrangement of FIGS. 5 and 6, each knife guard 50 comprises a pointed guard with a shoulder 51 extending upwardly from the ledger surface 52 of a guard finger 53 thereof and a tip portion 54 thereof extending forwardly of the shoulder 51.

In this case, each blade section 23 can be pulled out from the pointed guards 50 and removed without removing the fasteners 40 from the drive bar 24A and without removing or loosening the hold down members 60. This can be achieved typically by locating the sickle bar in a preferred longitudinal location and by sliding the blade section 23 forwardly until it is free from its neighbors and can be moved side to side to pass the shoulder 51 of the guard 50.

This movement can be assisted by providing no conventional tang, that is, there is no portion of the pointed guard 50 extending rearwardly over the ledger surface 53 from the shoulder 51.

This movement can also be assisted where the shoulder 51 has a width W1 less than that of the ledger surface W. This is formed by providing chamfered surfaces 56, 57 on each side of the shoulder 51 and extending vertically from the ledger surface and forwardly into the tip 54 at angle to each side of the shoulder 51. This allows the v-shaped space 23X between the two blade portions to move forwardly onto the shoulder 51 with each side of the space 28X on a respective side of the shoulder 51 at the chamfered surface 56, 57 so as to as to allow the blade sections to be moved as far forwardly as possible. This allows the finger 61 of the hold down 60 to project as far forward as possible to apply the best hold down action while allowing the blade section 23 to move to a position where it can be lifted by the front apex 23B to clear the shoulder 51 and to be released from the drive bar 24A.

Figure 7:
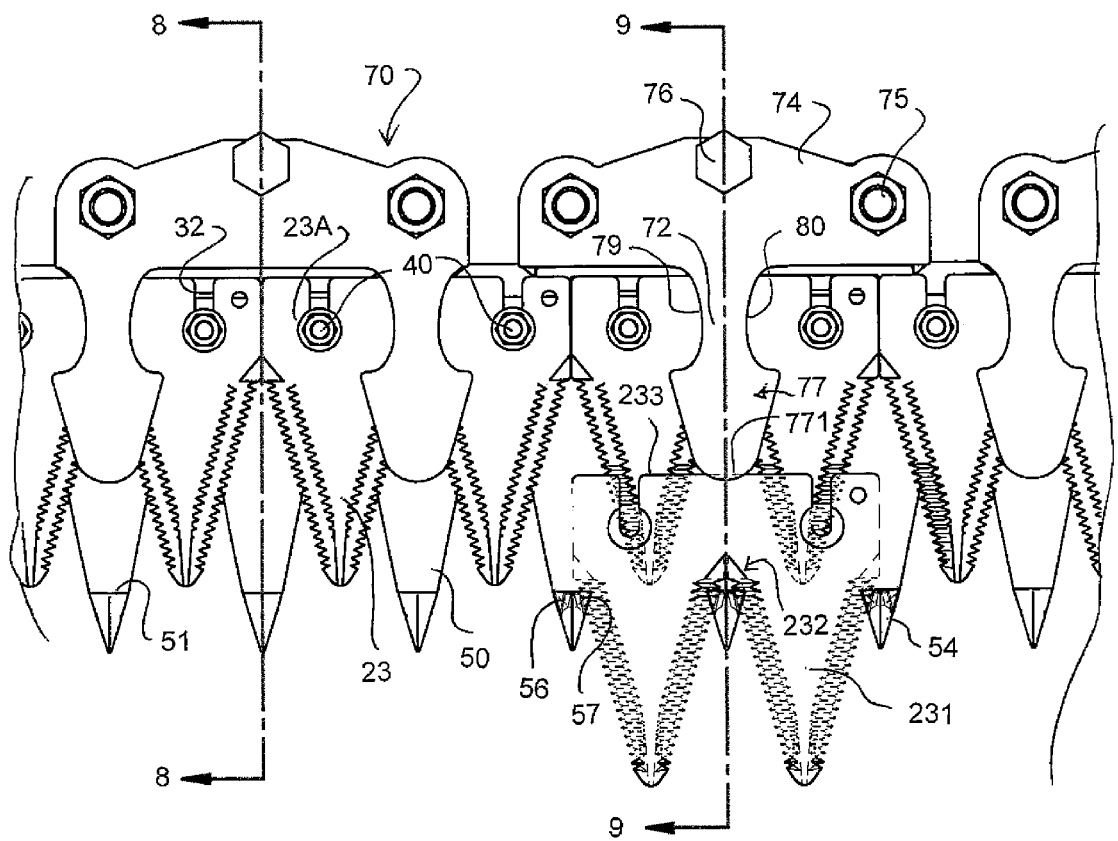
FIG. 7 is a top plan view of a part of header showing a section of the sickle knife according to a further embodiment of the present invention using a modified hold-down member which is forged so as to be structurally more rigid.
Figure 8:
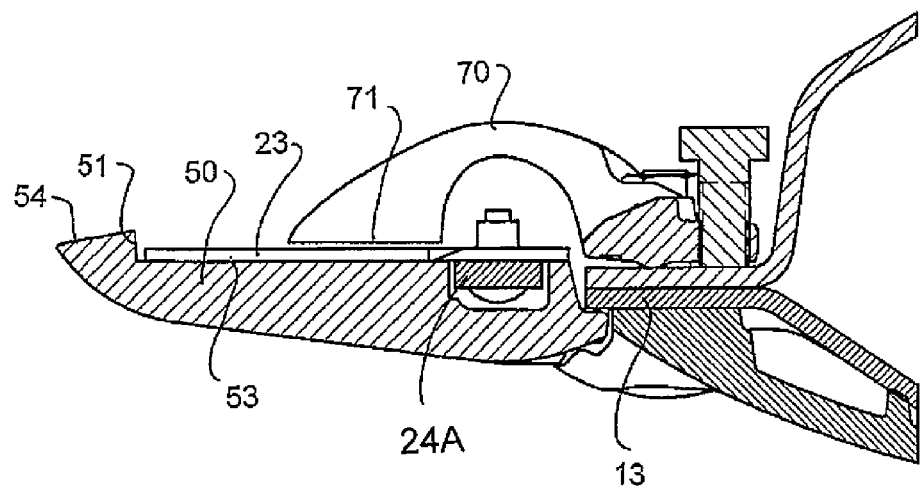
FIG. 8 is a cross-sectional view along the lines 8-8 of FIG. 7.
Figure 9:
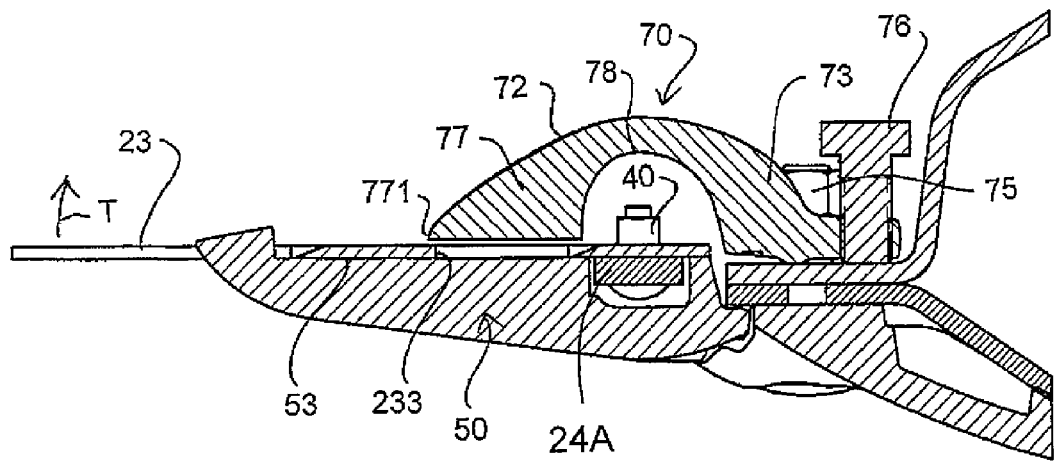
FIG. 9 is a cross-sectional view along the lines 9-9 of FIG. 7 showing the blade moved to the position to release the blade.

In FIGS. 7, 8 and 9 is shown a further modified version having most of the components and operation of the embodiment of FIG. 5 but including a modified hold-down member 70. This includes a surface 71 at a front end which engages the upper surface of the blade portions as the blade portions reciprocate side to side to hold the blade portions down onto the ledger surface 53 of the guards 50. The hold down 70 is forged or otherwise formed from a rigid metal structure rather than a sheet metal construction so as to provide a high level of rigidity which resists the upward movement of the surface 71. The hold down 70 has an arched upper surface 72 extending to a rear mounting portion 73 with a rear mounting flange 74 which is attached onto the cutter bar 13 by a pair of bolts 75 with a center adjustment bolt 76 which presses onto the cutter bar 13 to raise or lower the surface 71. The surface 71 is provided on the underside of a finger portion 77 extending forwardly from the rear flange and aligned with the center bolt 76. An arched bottom surface 78 clears the bar 24 and the fasteners 40 attaching the blade section to the bar 24. The sides 79 and 80 of the finger 77 are recessed at a position aligned with the fasteners 40 to allow the fasteners to be readily accessed from above between the fingers of adjacent hold down members without the necessity to loosen or remove the hold down members. Thus a portion of the finger at the surface 71 in front of the bar 24 is wider than the recessed sides 79, 80.

Thus, as best shown in FIGS. 7 and 9, the blade section 231 is pulled forwardly until the V-shaped area 232 between the side edges of the two blade portions reaches the shoulder 51 and moves forwardly at the shoulder by the V-shaped area 232 straddling the narrower part of the shoulder. This forward movement is arranged to coincide with the release of the rear edge 233 of the blade section from the front edge 771 of the finger 77 so that the blade section can be tilted upward in the direction of arrow T so that the blade section is released from the front tip 771 of the hold down member and can be readily removed to be replaced in a reverse action with a new blade section.

While shown in the Figures as being used with a blade arrangement where the center line to center line spacing of the blade tips is of the order of 2 inches, it is possible to use the same construction with a blade section which has a center line spacing of 3 inches which is more typically used in conventional constructions. In addition while the arrangement is shown with two blade portions attached to a single mounting member, a single blade portion construction can also operate in the same manner.

The invention claimed is:

1. A sickle cutting apparatus comprising:
a frame structure arranged for forward travel over ground having a standing crop thereon;
a cutter bar secured to the frame structure and extending transversely across a front end of said frame structure;
a plurality of stationary knife guards mounted along the cutter bar;
each of said stationary knife guards including at least one finger projecting forwardly therefrom;
each guard finger having an upwardly facing ledger surface with opposed side edges thereof arranged to provide first and second shearing edges;
a sickle bar mounted in transversely extending position and being driven for reciprocating movement relative to said guard fingers;
the sickle bar having a plurality of blade sections mounted thereon for movement therewith;
each of the blade sections having a rear plate portion for mounting on the sickle bar and at least one forwardly extending blade portion;
each of the blade portions having a cutting surface for passing across the knife guard fingers;
each of the blade portions having on first and second sides first and second side cutting edges to cooperate with shearing edges of said guard fingers;
a plurality of hold-down members;
each of said hold-down members having a rear mounting section mounted at the cutter bar;
each of said hold-down members including at least one forwardly extending hold-down element for engaging an upper surface of a blade section as it passes the hold-down element to hold down the blade sections onto the ledger surfaces of the guard fingers;
each of the rear plate portions having at least one fastener hole cooperating with a mating hole in the sickle bar and receiving through the plate portion and the sickle bar a threaded mounting fastener which can be tightened to clamp the rear plate portion to the sickle bar and can be loosened to release the rear plate position to slide relative to the sickle bar;
said at least one fastener hole being connected to an associated slot extending rearwardly in the rear plate portion from said at least one fastener hole to a rear edge of the rear plate portion to allow the rear plate portion to slide forwardly from the sickle bar.

2. The sickle cutting apparatus according to claim 1 wherein said at least one hole comprises two holes in said rear plate portion arranged at positions thereon spaced longitudinally of the sickle bar with each of said two holes including a respective associated slot extending rearwardly in the rear plate portion from said fastener hole to a rear edge of the rear plate portion.

3. The sickle cutting apparatus according to claim 1 wherein each rear plate portion includes two side by side blade portions.

4. A sickle cutting apparatus comprising:
- a frame structure arranged for forward travel over ground having a standing crop thereon;
- a cutter bar secured to the frame structure and extending transversely across a front end of said frame structure;
- a plurality of stationary knife guards mounted along the cutter bar;
- each of said stationary knife guards including at least one finger projecting forwardly therefrom;
- each guard finger having an upwardly facing ledger surface with opposed side edges thereof arranged to provide first and second shearing edges;
- a sickle bar mounted in transversely extending position and being driven for reciprocating movement relative to said guard fingers;
- the sickle bar having a plurality of blade sections mounted thereon for movement therewith;
- each of the blade sections having a rear plate portion for mounting on the sickle bar and at least one forwardly extending blade portion;
- each of the blade portions having a lower cutting surface for passing across the knife guard fingers and an upper surface;
- each of the blade portions having on first and second sides first and second side cutting edges to cooperate with shearing edges of said guard fingers;
- a plurality of hold-down members;
- each of said hold-down members having a rear mounting section mounted at the cutter bar;
- each of said hold-down members including at least one forwardly extending hold-down element for engaging an upper surface of a blade section as it passes the hold-down element to hold down the blade sections onto the ledger surfaces of the guard fingers;
- each of the rear plate portions having at least one fastener hole cooperating with a mating hole in the sickle bar and receiving through the plate portion and the sickle bar a threaded mounting fastener which can be tightened to clamp the lower surface of the rear plate portion to the sickle bar and can be loosened to release the rear plate position for sliding movement relative to the sickle bar;
- the threaded mounting fastener including a portion thereof standing proud of the upper surface;
- said at least one fastener hole being connected to an associated slot extending rearwardly in the rear plate portion from said at least one fastener hole to a rear edge of the rear plate portion to allow the rear plate portion to slide forwardly from the sickle bar;
- wherein each rear plate portion has at said at least one fastener hole a peripherally extending recess surrounding said at least one fastener hole and recessed from said upper surface of the rear plate portion to receive a peripheral portion of the threaded mounting fastener larger in transverse dimension than the slot which peripheral portion is engaged into the recess and holds the rear plate portion against said sliding movement.

5. The sickle cutting apparatus according to claim 4 wherein the recess is a conical countersink.

6. The sickle cutting apparatus according to claim 4 wherein the recess is a cylindrical counter-bore.

7. The sickle cutting apparatus according to claim 1 wherein the blade sections and the hold-down members are arranged such that the fastener in each hole in the rear plate portions is accessible from above without removing the hold down members.

8. The sickle cutting apparatus according claim 1 wherein each knife guard cooperates with a respective one of the hold-down members to form cooperating elements of a stub guard where the blade portions project forwardly to a position in front of the stub guards and wherein each blade section can be pulled forwardly from the stub guards and removed without removing the fasteners from the sickle bar and without removing or loosening the stub guards.

9. The sickle cutting apparatus according to claim 1 wherein each knife guard comprises a pointed guard with a shoulder extending upwardly from the ledger surface of a guard finger thereof and a portion thereof extending forwardly of the shoulder, and wherein each blade sections can be pulled out from the pointed guards and removed without removing the fasteners from the sickle bar and without removing or loosening the hold down members.

10. The sickle cutting apparatus according to claim 9 wherein there is no portion of the pointed guard extending rearwardly over the ledger surface from the shoulder.

11. The sickle cutting apparatus according to claim 10 wherein the shoulder has a width less than that of the ledger surface so as to as to allow the blade sections to be moved forwardly to a position where the each blade section can be pulled out from the pointed guards and removed without removing the fasteners from the sickle bar and without removing or loosening the hold down members.

12. A knife blade section for mounting on a sickle bar of a sickle cutting apparatus, the section comprising:
- a rear plate portion for mounting on the sickle bar;
- at least one forwardly extending blade portion;
- each of the blade portions having a top surface and a lower cutting surface and having on first and second sides thereof first and second side cutting edges;
- each of the blade portions having said first side edge and said second side edge beveled from the top surface down to the lower cutting surface so that a sharp edge is formed at the lower cutting surface at each of the side edges;
- each of the blade portions being serrated at said first and second side edges with grooves extending transverse to a center line of the blade portion;
- the rear plate portion having at least one fastener hole for cooperating with a mating hole in the sickle bar for receiving through the plate portion and the sickle bar a mounting fastener;
- said at least one fastener hole being connected to an associated slot extending rearwardly in the rear plate portion from said at least one fastener hole to a rear edge of the rear plate portion.

13. The knife blade section according to claim 12 wherein said at least one hole comprises two holes in said rear plate portion arranged at positions thereon spaced longitudinally of the sickle bar with each of said two holes including a respective associated slot extending rearwardly in the rear plate portion from said fastener hole to a rear edge of the rear plate portion.

14. The knife blade section according to claim 12 wherein said rear plate portion includes two side by side blade portions.

15. A knife blade section for mounting on a sickle bar of a sickle cutting apparatus, the section comprising:
- a rear plate portion for mounting on the sickle bar;
- at least one forwardly extending blade portion;

each of the blade portions having a top surface and a lower cutting surface and having on first and second sides thereof first and second side cutting edges;

each of the blade portions having said first side edge and said second side edge beveled from the top surface down to the lower cutting surface so that a sharp edge is formed at the lower cutting surface at each of the side edges;

each of the blade portions being serrated at said first and second side edges with grooves extending transverse to a center line of the blade portion;

the rear plate portion having at least one fastener hole for cooperating with a mating hole in the sickle bar for receiving through the plate portion and the sickle bar a mounting fastener;

said at least one fastener hole being connected to an associated slot extending rearwardly in the rear plate portion from said at least one fastener hole to a rear edge of the rear plate portion;

wherein said rear plate portion has at said at least one fastener hole a peripherally extending recess surrounding said at least one fastener hole and recessed from a surface of the rear plate portion to receive a peripheral portion of the fastener larger in transverse dimension than the slot engaged into the recess.

16. The knife blade section according to claim 15 wherein the recess is a conical countersink.

17. The knife blade section according to claim 15 wherein the recess is a cylindrical counter-bore.

18. The sickle cutting apparatus according to claim 1 wherein each of the blade portions has said first side edge and said second side edge beveled from the top surface down to the lower cutting surface so that a sharp edge is formed at the lower cutting surface at each of the side edges and wherein each of the blade portions is serrated at said first and second side edges with grooves extending transverse to a center line of the blade portion.

\* \* \* \* \*